(12) United States Patent
Shishido

(10) Patent No.: US 7,145,668 B2
(45) Date of Patent: Dec. 5, 2006

(54) PRINT SYSTEM, PRINTING METHOD, INFORMATION PROCESSING APPARATUS, PRINTING APPARATUS, PRINTER DRIVER, AND MEMORY MEDIUM

(75) Inventor: Kazunari Shishido, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1009 days.

(21) Appl. No.: 10/020,229

(22) Filed: Dec. 18, 2001

(65) Prior Publication Data

US 2002/0080370 A1 Jun. 27, 2002

(30) Foreign Application Priority Data

Dec. 22, 2000 (JP) .............................. 2000/390995

(51) Int. Cl.
*G06F 15/00* (2006.01)
(52) U.S. Cl. ..................... 358/1.1; 358/1.15; 358/1.16; 358/1.9; 382/232
(58) Field of Classification Search ................. 358/1.1, 358/1.5, 1.15, 1.16, 1.9; 382/232
See application file for complete search history.

(56) References Cited

U.S. PATENT DOCUMENTS

| | | | | |
|---|---|---|---|---|
| 5,778,160 A | * | 7/1998 | Smith .......................... | 358/1.9 |
| 5,815,599 A | * | 9/1998 | Iwasaki ....................... | 382/232 |
| 5,845,057 A | * | 12/1998 | Takeda et al. ............. | 358/1.15 |
| 5,854,886 A | * | 12/1998 | MacMillan et al. ........ | 358/1.15 |
| 6,053,645 A | * | 4/2000 | Myung ........................ | 400/64 |
| 6,120,197 A | * | 9/2000 | Kawamoto et al. ........... | 400/61 |
| 6,247,786 B1 | * | 6/2001 | Booth et al. .................. | 347/40 |
| 6,304,335 B1 | * | 10/2001 | Furuya et al. ............. | 358/1.15 |
| 6,449,055 B1 | * | 9/2002 | Okimoto et al. ........... | 358/1.15 |
| 6,462,830 B1 | * | 10/2002 | Negishi ..................... | 358/1.12 |
| 6,578,944 B1 | * | 6/2003 | Kamei et al. ................ | 347/16 |
| 6,590,674 B1 | * | 7/2003 | Orton ........................ | 358/1.18 |
| 2002/0021453 A1 | * | 2/2002 | Sakamoto et al. ......... | 358/1.14 |
| 2002/0057443 A1 | * | 5/2002 | Watanabe ................... | 358/1.9 |
| 2003/0076534 A1 | * | 4/2003 | Li et al. .................... | 358/1.16 |

FOREIGN PATENT DOCUMENTS

EP 750251 A1 * 12/1996

* cited by examiner

*Primary Examiner*—Kimberly Williams
*Assistant Examiner*—Ashish K. Thomas
(74) *Attorney, Agent, or Firm*—Fitzpatrick, Cella, Harper & Scinto

(57) ABSTRACT

A print system in which when a print driver can previously confirm data structure information during data generation, printing efficiency can be raised by using the structure information is provided. While the printer driver which is made operative by a host computer is generating print data, if the structure information of the print data can be confirmed, prior to sending the print data, structure information of the data is sent to a printer. For example, when the printer is notified of structure information showing that color/monochrome data continues for a predetermined number of rasters in the first block of the print data by a host computer, the printer selects the optimum printing method on the basis of the structure information without analyzing the print data.

24 Claims, 10 Drawing Sheets

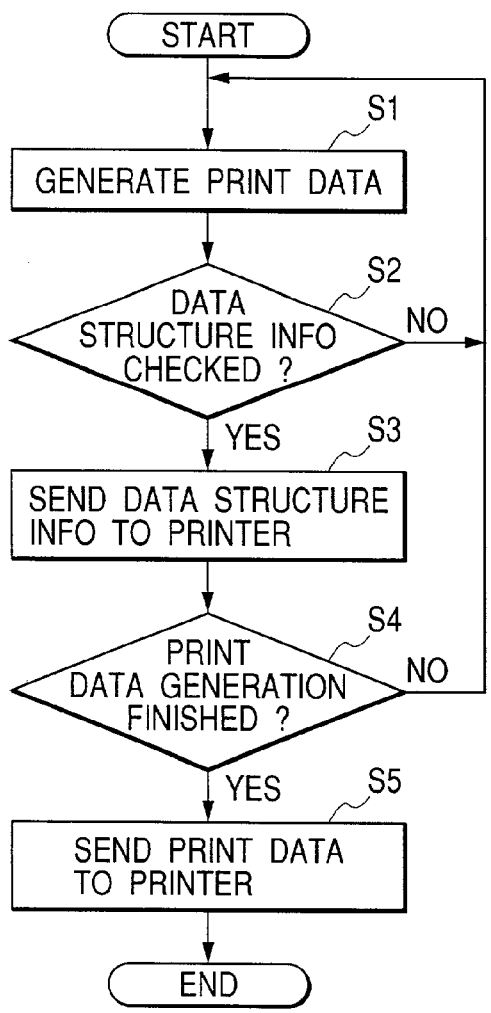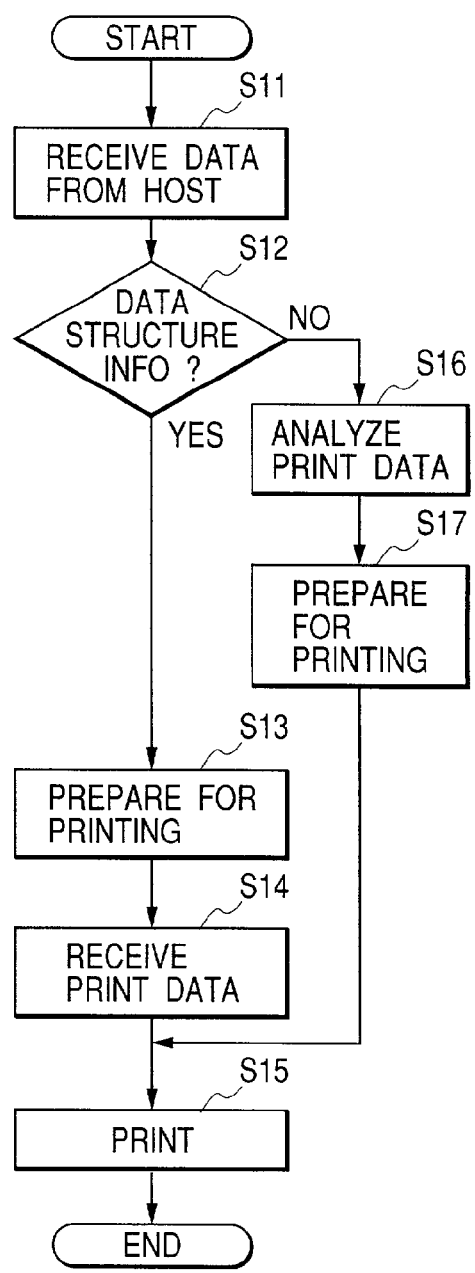

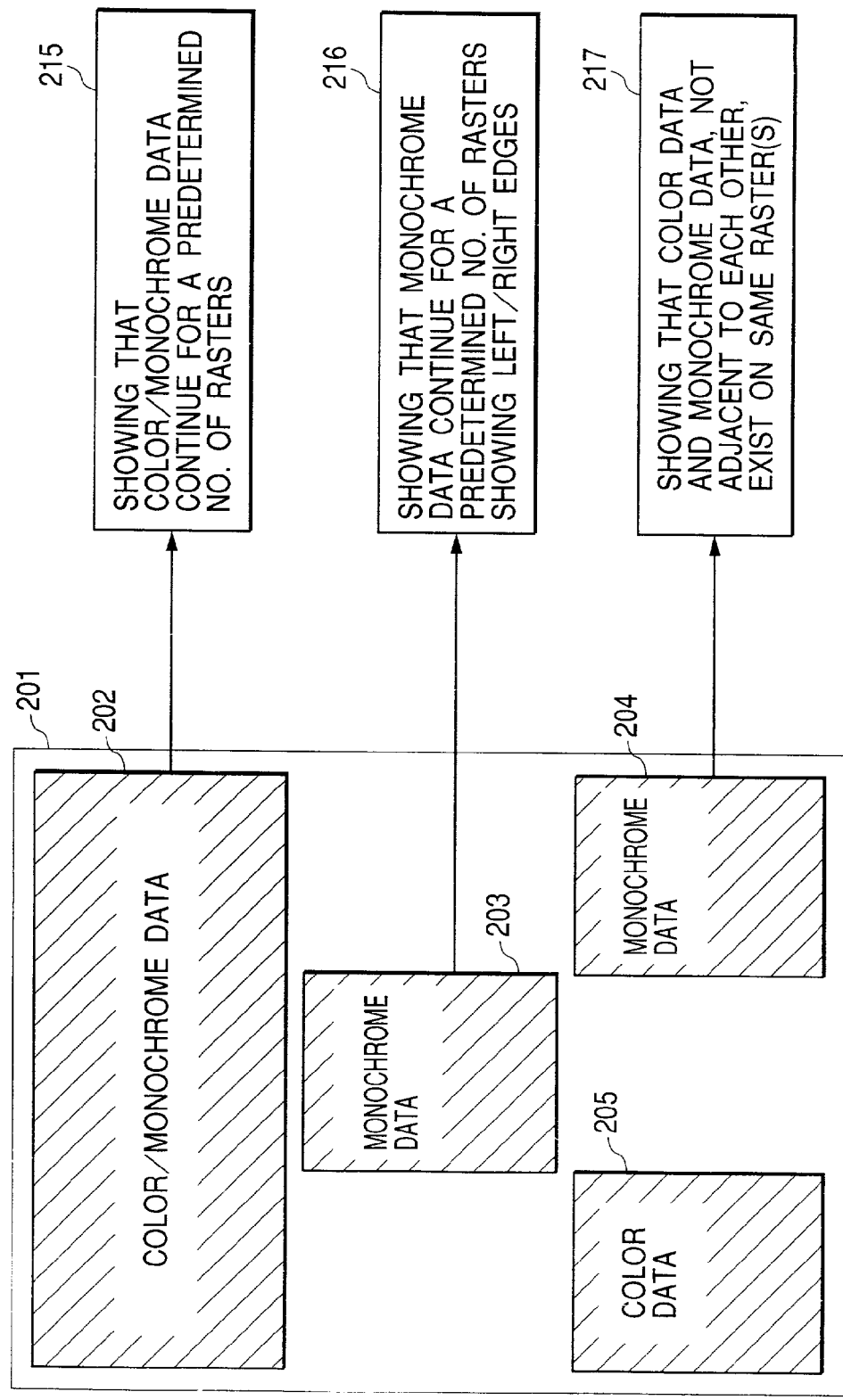

PRINT SYSTEM, PRINTING METHOD, INFORMATION PROCESSING APPARATUS, PRINTING APPARATUS, PRINTER DRIVER, AND MEMORY MEDIUM

BACKGROUND OF THE INVENTION

1. Field of the Invention

The invention relates to a print system, a printing method, an information processing apparatus, a printing apparatus, a printer driver, and a memory medium.

2. Related Background Art

Hitherto, a process by a printer driver and a process by a printing apparatus are independently executed. After instructions of a print mode, a page margin, and the like are sent from the printer driver, during the data generation on the printer driver side, even if information which can be checked exists, the printer apparatus is not particularly notified of the information but only print data is sent. At this time, the printer driver sends the data to the printing apparatus in data processing order. For example, in case of printing color/monochrome data (color data and monochrome data exist mixedly), a printer main body changes a printing method lest a blur is caused between color/monochrome images.

However, in case of changing the printing method in accordance with the print data which is sent in order as in the conventional method, it is necessary that the printer main body starts to print after checking whether the color/monochrome data exists in the data or not.

That is, since the printer main body cannot check what kind of data will be subsequently sent, it receives the next data in a state where all cases are presumed preparing for the next data, checks contents of the sent data, and executes the print while selecting an operation so as to perform the optimum print.

Therefore, the printer main body has to execute processes for reserving a surplus buffer for storing the data and analyzing the contents of the data before the print, so that it takes a processing time. In case of the data existing over pages, whether data exists in the next page or not cannot be checked or in which print mode the next page is cannot be checked. Therefore, even if the same mode continues, it is necessary to interrupt the processes once, wait until the end of the current print presuming a situation such that a buffer construction has to be changed when the print mode is changed to the next print mode, and, thereafter, execute the next printing operation.

SUMMARY OF THE INVENTION

It is, therefore, an object of the invention to provide a print system, a printing method, an information processing apparatus, a printing apparatus, a printer driver, and a memory medium, in which in the case where the printer driver can previously confirm structure information of data during the data generation, print efficiency can be raised by using the confirmed structure information.

To accomplish the above object, according to the invention, there is provided a printing method of allowing a printing apparatus to print by using print data which is sent by a printer driver which is made operative by an information processing apparatus, comprising the steps of: adding structure information of the print data by the printer driver to the print data which is sent; sending the added structure information to the printing apparatus; and executing a printing process of the print data by the printing apparatus on the basis of the received structure information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3A and 3B are flowcharts each showing a print processing procedure in the print system;

FIG. 4 is a diagram showing a specific example of structure information of data;

DETAILED DESCRIPTION OF THE PREFERRED EMBODIMENTS

An embodiment of a print system, a printing method, an information processing apparatus, a printing apparatus, a printer driver, and a memory medium of the invention will now be described with reference to the drawings.

(First Embodiment)

Figure 1:
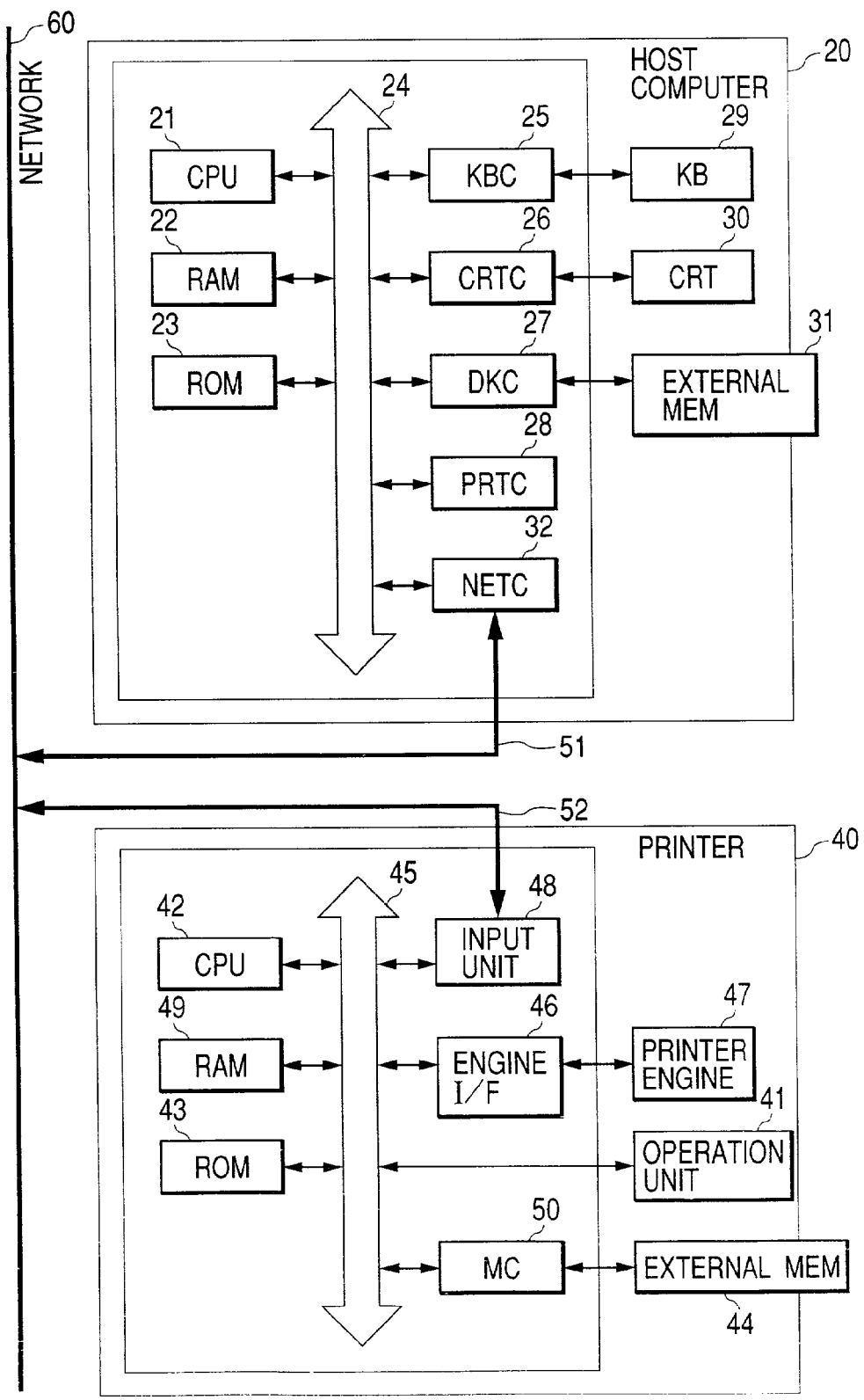
FIG. 1 is a block diagram showing a construction of a print system in the first embodiment.

FIG. 1 is a block diagram showing a construction of the print system in the first embodiment. According to the print system, a host computer 20 and a printer 40 are connected via a network 60, and a print job which is sent from the host computer 20 is printed by the printer 40.

The host computer 20 has a CPU 21 for executing processes of a document in which figures, images, characters, tables (including a spreadsheet and the like), and the like exist mixedly on the basis of a document processing program stored in an ROM 23, or the like. The CPU 21 integratedly controls each device connected to a system bus 24. An operating system (hereinafter, abbreviated to "OS") as a control program which is executed by the CPU 21, and the like have been stored in the ROM 23.

An RAM 22 functions as a main memory, a work area, or the like of the CPU 21. A keyboard controller (KBC) 25 controls a key input from a keyboard (KB) 29 or a pointing device (not shown). A CRT controller (CRTC) 26 controls a display of a CRT display (CRT) 30. A disk controller (DKC) 27 controls an access to an external memory 31 such as hard disk (HD), floppy disk (FD), or the like. A boot program, various applications, font data, user files, edit files, a character image data generating program, a printer control command generating program (hereinafter, referred to as a printer driver), and the like have been stored in the external memory 31.

Reference numeral 28 denotes a printer controller (PRTC) which is connected to the printer via a predetermined bidirectional interface (interface or I/F) and which executes a control process of communication with the printer. In the embodiment, however, a control process of communication with the printer 40 or another computer connected to the network 60 such as an LAN via a bidirectional interface 51 is executed by a network controller 32 (NETC).

The printer 40 has a printer CPU 42. On the basis of a control program stored in an ROM 43, the printer CPU 42 outputs an image signal as output information to a printer engine 47 via an engine interface 46 connected to a system bus 45.

The control program and the like which are executed by the CPU 42 have been stored in the ROM 43. The CPU 42 can communicate with the host computer 20 via an input unit 48 and notifies the host computer 20 of information and the like in the printer. In the embodiment, the CPU 42 can communicate with the host computer 20, another computer, or another printer connected to the network 60 such as an LAN from the input unit 48 via a bidirectional interface 52.

The RAM 49 functions as a main memory, a work area, or the like of the CPU 42. An external memory 44 is an IC card or the like and an access to it is controlled by a memory controller (MC) 50. Switches which are operated on the operation panel, an LED display, and the like are arranged in an operation unit 41. Printer mode setting information can be stored into the external memory 44 by using the operation unit 41.

Figure 2B:
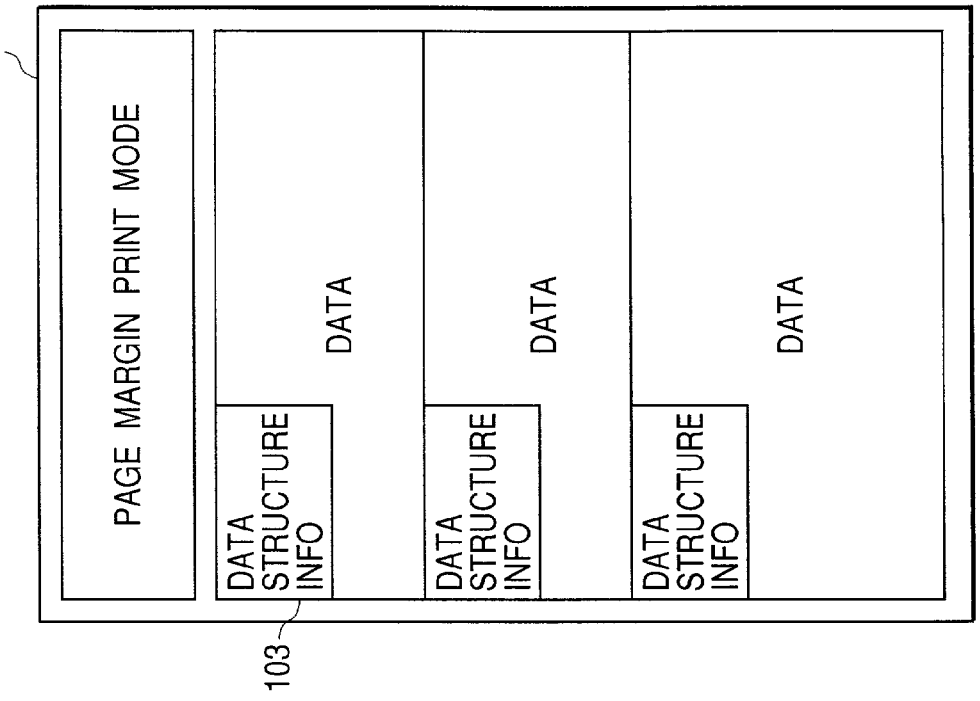
FIGS. 2A and 2B are diagrams each showing a construction of a print job which is sent to a printer 40 by a printer driver in comparison with a conventional construction.
Figure 2A:
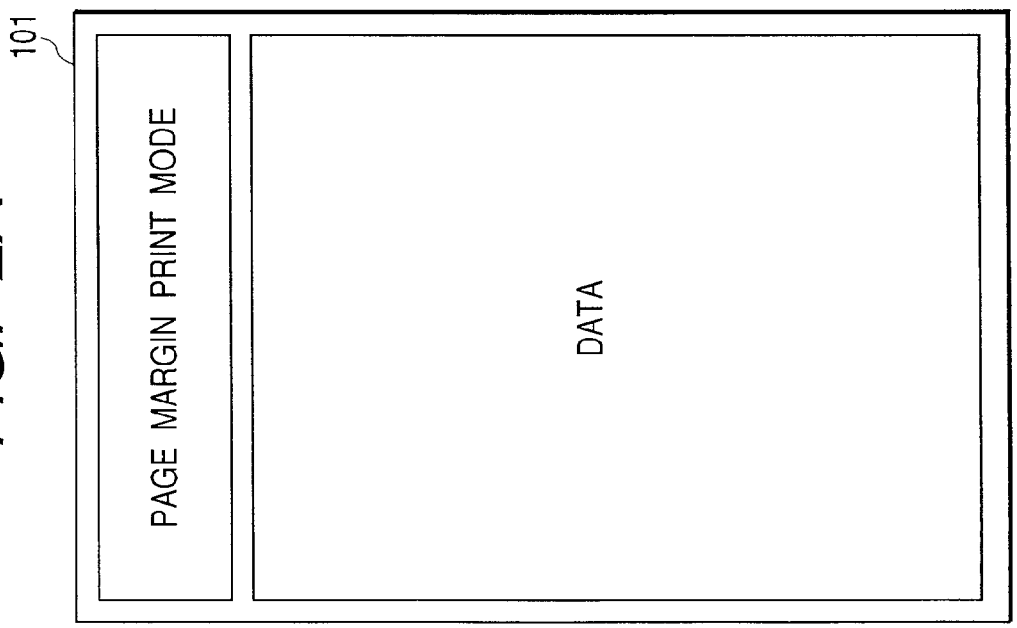

Subsequently, generating and sending processes of a print job in the print system having the above construction will be described. FIG. 2A is a diagram showing a construction of a conventional print job which is sent to the printer 40 by the printer driver. FIG. 2B shows a construction of the print job according to the embodiment.

In FIG. 2A, reference numeral 101 denotes a conventional print job which is sent to the printer by the printer driver. Hitherto, the processes of the printer driver and the processes of the printer are independently executed. After instructions of the print mode, page margin, and the like are sent from the printer driver, during the data generation on the printer driver side, even if information which can be confirmed exists, the printer is not particularly notified of the information but only the print data is sent.

Since the information regarding the print data is given only by a relatively large unit such as a page or the like, in order to use it for the actual print, the information is insufficient. Therefore, in order to check a data structure more in detail, the printer accumulates a predetermined amount of the received print data, selects an optimum printing method while checking the data structure, and starts to print. Since such processes need a predetermined amount of buffer and require a data process before printing, they become a load on the printer side.

In FIG. 2B, according to a print job 102 in the embodiment, data structure information (DSI) 103 is sent before the print data is sent. A data range (data area) which designates the data structure information can be arbitrarily set. For example, the data area can be a block unit in which the data structure changes, a unit of a predetermined amount, a unit which is convenient when the printer driver recognizes the information, or the like. If the data structure information 103 has been added to the print data, since it is sufficient that the printer uses the data structure information 103, there is no need to newly analyze the data structure.

FIGS. 3A and 3B are flowcharts showing a print processing procedure in the print system. In FIG. 3A, a printer driver program has been stored in the external memory 31 in the host computer 20 and is executed by the CPU 21. A print processing program in FIG. 3B has been stored in the ROM 43 in the printer 40 and is executed by the CPU 42.

On the host computer 20 side, when the printer driver starts to generate the print data (step S1), whether the data structure information could be checked during the generation of the print data or not is discriminated (step S2). If the data structure information cannot be checked, the processing routine is returned to the process of step S1 and the generation of the print data is continued. If the data structure information can be checked, the data structure information is sent to the printer 40 (step S3). Whether the generation of the print data has been finished or not is discriminated (step S4). If the generation of the print data is not finished, the processing routine is returned to the process of step S1 and the generation of the print data is continued. If the generation of the print data is finished, the print data is sent (step S5) and the processing routine is finished.

On the printer 40 side, when the data sent from the host computer 20 is received (step S11), whether the received data is the data structure information or not is discriminated (step S12). If it is the data structure information, the printer 40 prepares for printing on the basis of it (step S13) and waits until the print data is received. When the print data is received (step S14), the print is executed (step S15) and the processing routine is finished. If the received data is not the data structure information in step S12 but is the print data itself, the received print data is analyzed (step S16). The printer prepares for printing on the basis of an analysis result (step S17). After that, the print is executed in step S15 and the processing routine is finished.

FIG. 4 is a diagram showing a specific example of the data structure information. A case where print data 202, 203, 204, and 205 is arranged on a print paper 201 is now considered. In the first block, the host computer 20 first notifies the printer 40 of structure information 215 of the print data 202 in which color data and monochrome data exist mixedly. The structure information 215 shows that the color/monochrome data (color data and monochrome data exist mixedly) continues for a predetermined number of rasters. On the basis of the structure information 215, the printer 40 selects the optimum printing method without analyzing the print data.

In the next block, the host computer 20 notifies the printer 40 of structure information 216 of the print data 203 in which only monochrome data continues. Further, in this block, since data exists only in a range (area) narrower than the right and left margins designated at the head of a page, such information is also notified. The printer 40 executes an efficient print on the basis of the structure information 216.

Further, in the next block, although the color print data 205 and the monochrome print data 204 exist on the same raster, they are not adjacent to each other. The host computer 20 notifies the printer 40 of structure information 217 including their contents, so that the printer separately executes the printing process with respect to the monochrome portion and the color portion without analyzing the data.

As data structure information, the following information can be mentioned: that is, information showing whether the print data is the color data or the monochrome data, whether the color data and the monochrome data are adjacent to each other or not, and the like; information showing from what number line from the present position the print data starts, from what number line the color data starts, from what number line the monochrome data starts, and the like; information regarding the right and left edges of the print data; and the like.

According to the embodiment as mentioned above, for example, if the printer driver can preliminarily confirm the data structure information (information showing that with respect to the data of 20 lines after that, no color data exists, or the like) during the generation of the data, by sending this structure information to the printer, the printer can print without accumulating and analyzing the data.

Further, in a printer of a kind such that in the case where the print data is, for example, data of only monochrome data since a state of the preceding data has previously been known, the print data can be printed by the nozzles by increasing the number of nozzles which are used, a nozzle arrangement can be allocated from the beginning and the print can be efficiently performed.

By sending the data structure information prior to sending the actual data, the printer does not need to reserve a surplus buffer for the next data, and the print can be executed without analyzing contents of the data.

Although the case where the data structure information has been divided in accordance with the data construction has been shown and explained in the above embodiment, such a block unit can be arbitrarily set. For example, it can be set to a predetermined interval or, if there is a surplus in the processes on the printer driver side, it is also possible to preliminarily analyze the whole page, divide it into optimum blocks, and issue an instruction. If there is not a surplus in a partial process for the printer driver, only the print data can be also sent without adding the data structure information. In this case, with respect to the block without data structure information, the printer analyzes the data and starts to print in a manner similar to the conventional one.

Figure 5:
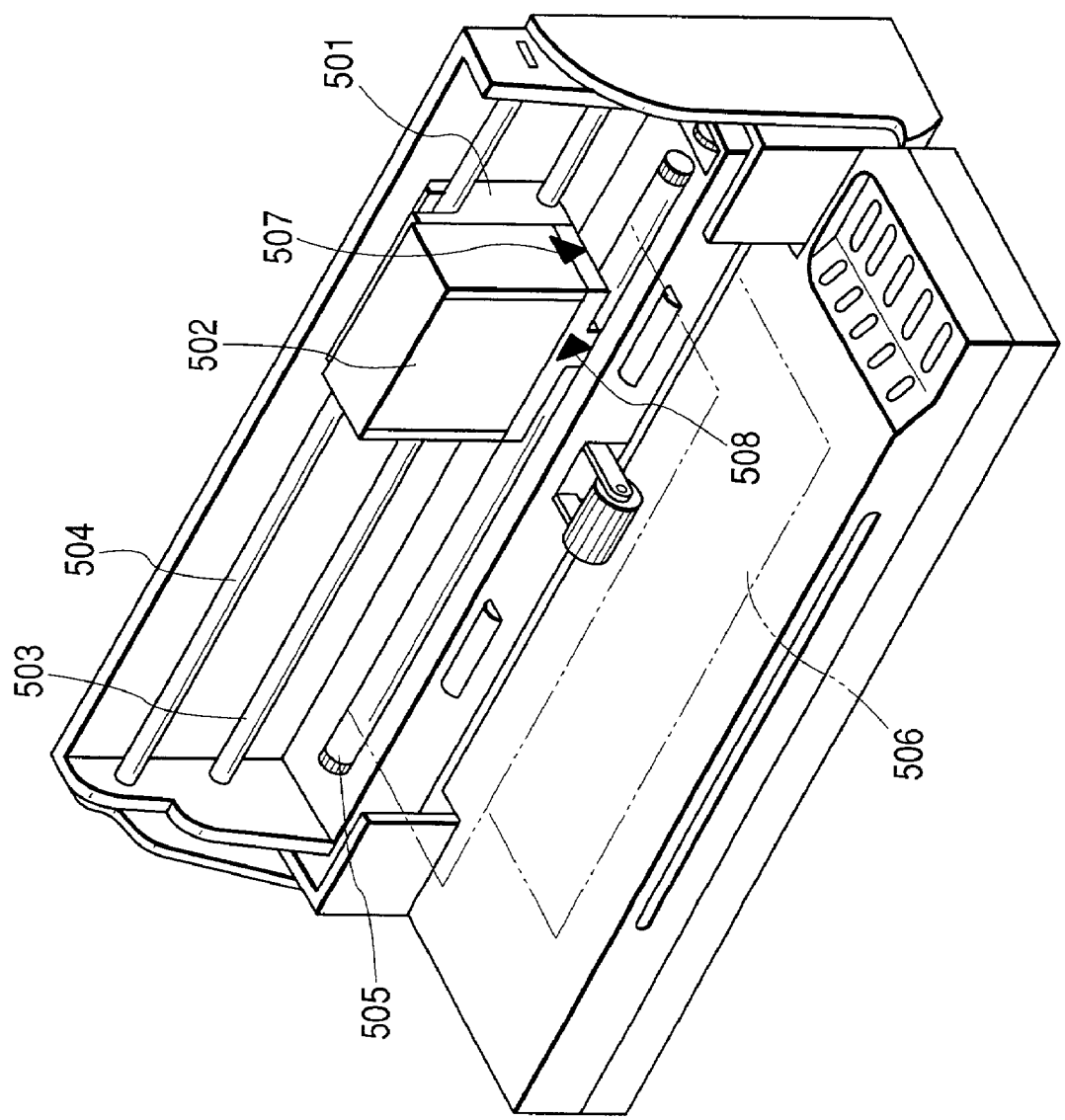
FIG. 5 is a perspective view of a printing apparatus.

FIG. 5 is a perspective view of a printing apparatus according to the embodiment of the invention. In FIG. 5, a print head 502 is mounted on a carriage 501. The carriage 501 is guided by guide rails 503 and 504 and moves right and left. Reference numeral 505 denotes a roller portion for feeding a print medium 506. Reference numerals 507 and 508 denote marks serving as guides marked on the print head 502. These marks indicate a printing position where the print is performed by the print head 502. For example, assuming that the print head 502 is an ink-jet head for printing by ejecting ink, the guides 507 and 508 function as indices of positions of print elements for ejecting the ink. Such guides 507 and 508 are used when the user determines a print start position as will be explained hereinlater.

By constructing the printing apparatus in a manner such that the print head 502 is provided with a lens in place of the guides 507 and 508 or together with them, and the print medium 506 can be seen from the printing position of the print head 502 via the lens, it is also possible to make such a construction useful for determination of the print start position by the user as will be explained hereinlater. The print head 502 can also construct an ink-jet cartridge together with an ink tank.

Figure 6:
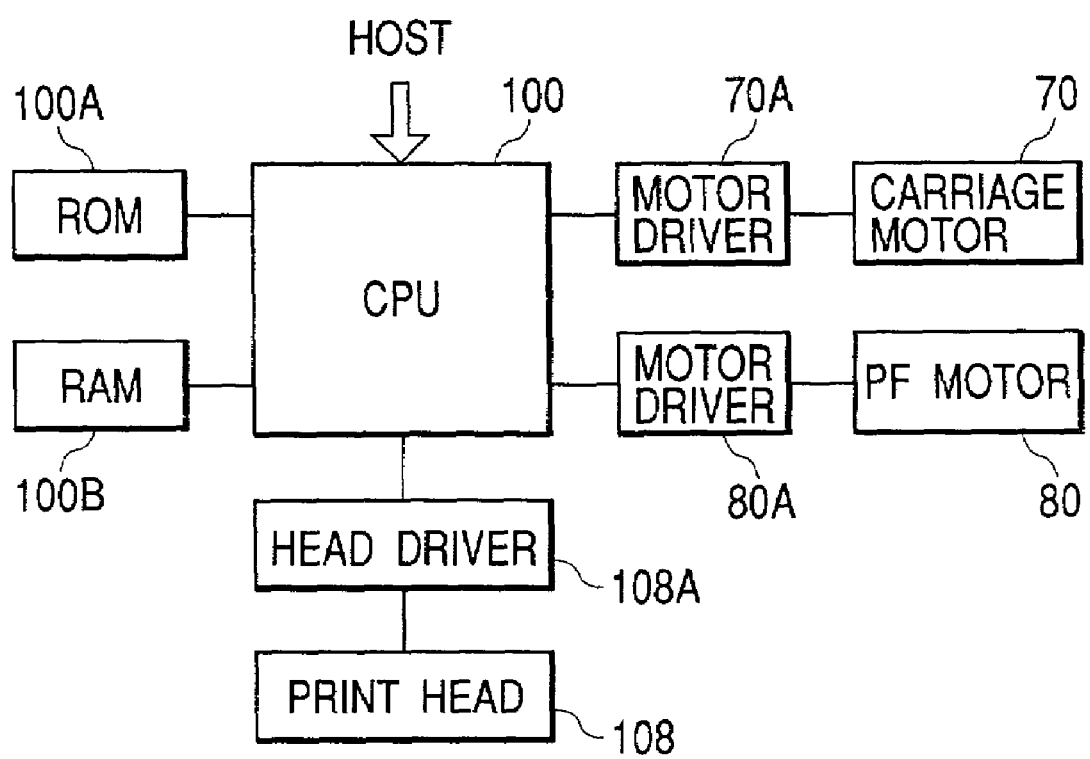
FIG. 6 is a block diagram showing a construction of a control system of the printing apparatus.

FIG. 6 is a block diagram showing a construction of a control system of the printing apparatus shown in FIG. 5.

In FIG. 6, a CPU 100 executes a control process of the operation of each section of the printing apparatus shown, a data process, and the like. Its processing procedure and the like have been stored in an ROM 100A. An RAM 100B is used as a work area to execute the above processes.

A print head 108 is, for example, an ink-jet print head for ejecting ink, the ink ejection is performed by a method whereby the CPU 100 supplies drive data and a drive control signal of an electrothermal converter to a head driver 108A. That is, a film boiling is caused in the ink by a thermal energy which is generated by the electrothermal converter, thereby allowing the ink to be ejected from an ejection port. The CPU 100 further controls a carriage motor 70 for moving the carriage 501 and a paper feed (PF) motor 80 for rotating the roller portion 505 via motor drivers 70A and 80A, respectively.

Figure 7:
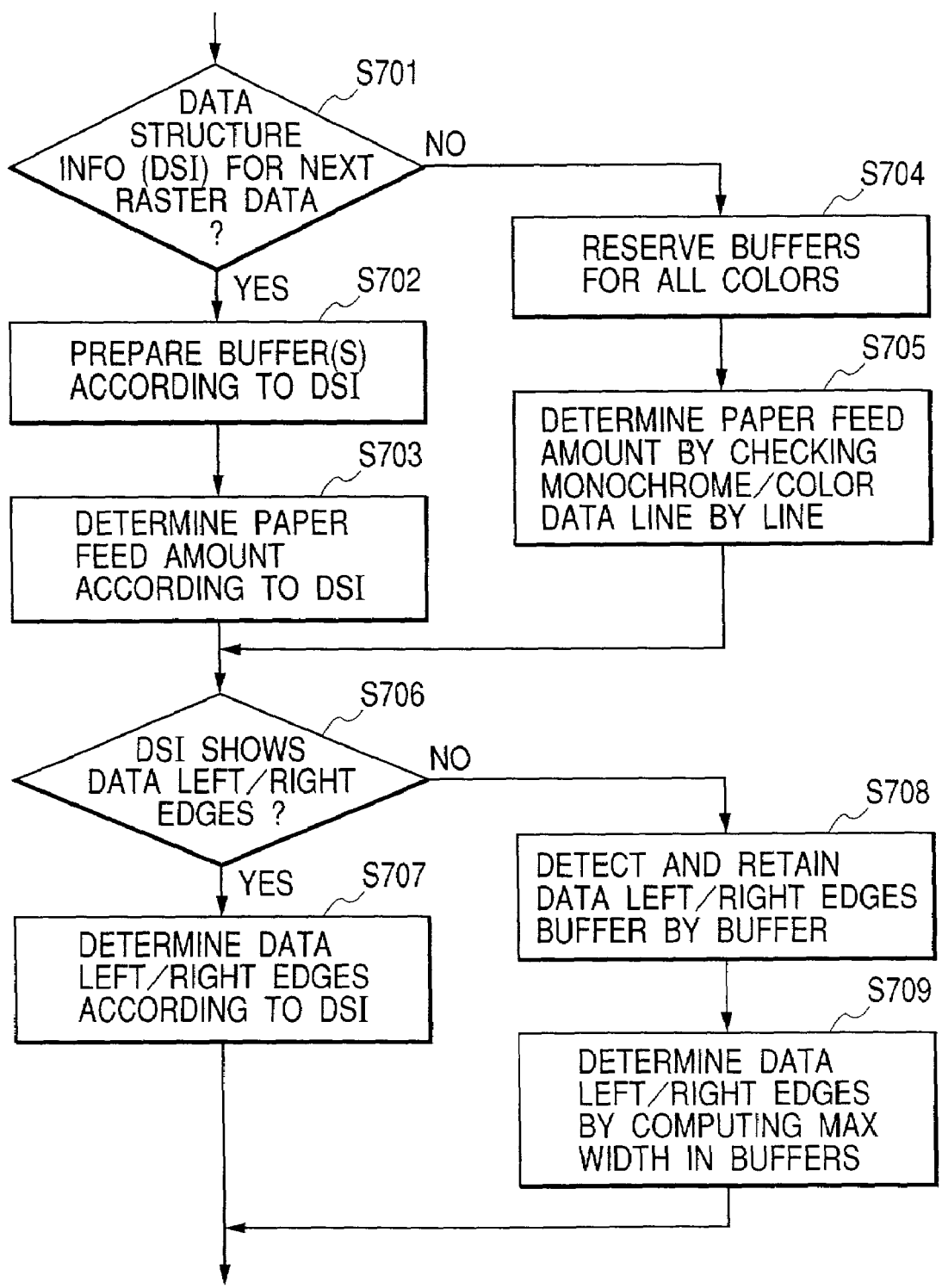
FIG. 7 is a flowchart showing a procedure in the case where the structure information was obtained on the printer side.

FIG. 7 is a flowchart showing a procedure in the case where the structure information was obtained on the printer side. When the structure information for the next data is obtained in step S701, the CPU of the printer prepares a buffer (or buffers) from color information in accordance therewith (S702) and determines an optimum paper feed amount and the optimum number of nozzles which are used in consideration of the positional relation of the color/monochrome data (S703). If the structure information cannot be obtained, the printer CPU first reserves the buffers presuming that the data of all colors is sent (S704). After that, the contents of the data are checked line by line, the existence of the color/monochrome data is checked, and the paper feed amount and the optimum number of nozzles which are used are determined (S705). If the information for the next data does not exist as mentioned above, the printer CPU needs to reserve the buffers in a state where all cases are presumed. In case of the data in which, for example, only the monochrome data exists for a plurality of lines after that, the buffers reserved for color data are not eventually used. On the other hand, if the fact that no color data is included in the next data can be previously confirmed by the structure information, the buffers for color data are not reserved but they are reserved as buffers for monochrome data, thereby enabling the finite buffers to be efficiently used. Also in the subsequent processes, if the structure information exists, the CPU can determine the paper feed amount and the optimum number of nozzles which are used by using the structure information. However, if there is no structure information, the CPU needs to check the data line by line and compute the optimum paper feed amount after that.

Further, whether information of a width of data has been added as structure information or not is discriminated (S706). If YES, in accordance with such information, the printer CPU can determine the right and left edges of the data and find a moving position of the head (S707). If the information is not added, contrarily, it is necessary that the right and left edges of the received data are first reserved buffer by buffer (S708), when the number of buffers which are used is decided by the determination of the number of nozzles which are used, the maximum width among the buffers is computed, and the moving position of the head is found (S709).

Figure 8:
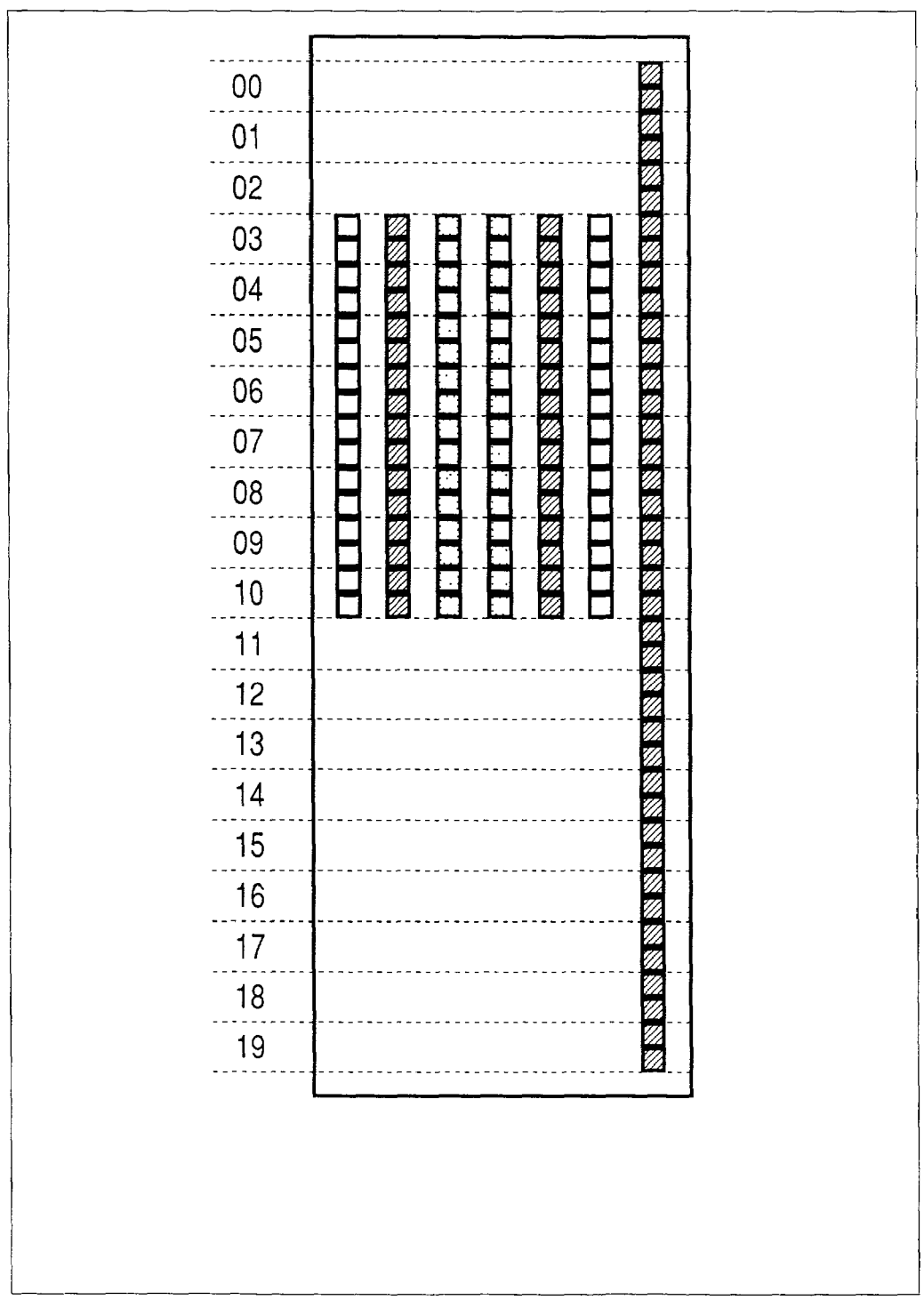
FIG. 8 is a diagram showing nozzles of a head.

FIG. 8 is a diagram showing the nozzles of the head. Upon printing, a paper is moved upward from the bottom of the drawing. Numerals denote numbers allocated on a unit basis of the buffer corresponding to a unit of a plurality of nozzles. The long nozzles on the right side correspond to the nozzles which are used when the monochrome data is printed and the other nozzles correspond to the nozzles for the color data of each color, respectively. For example, if the data of only black continues for the monochrome nozzles of Nos. 0 to 19 or more shown in the diagram, the print is performed by using all of the monochrome nozzles. The paper feed amount in this instance is determined so as to feed the paper by a distance corresponding to the number of monochrome nozzles in case of a print mode in which the data is completed by one path. In case of a print mode in which the data is completed by two paths, the paper feed amount is decided so as to feed the paper by the half distance of the above distance.

On the other hand, in case of printing a portion of the color/monochrome data, the print is first performed by using the monochrome nozzles of Nos. 12 to 19. After that, the paper is fed and at the point when the color nozzles reach the position where the monochrome image has been printed, the color data is printed. By this method, a time difference is caused between the print time of the monochrome data and that of the color data, a blur is prevented, and print quality can be improved. The procedure shown in FIG. 7 relates to processes for making such a discrimination.

Figure 9:
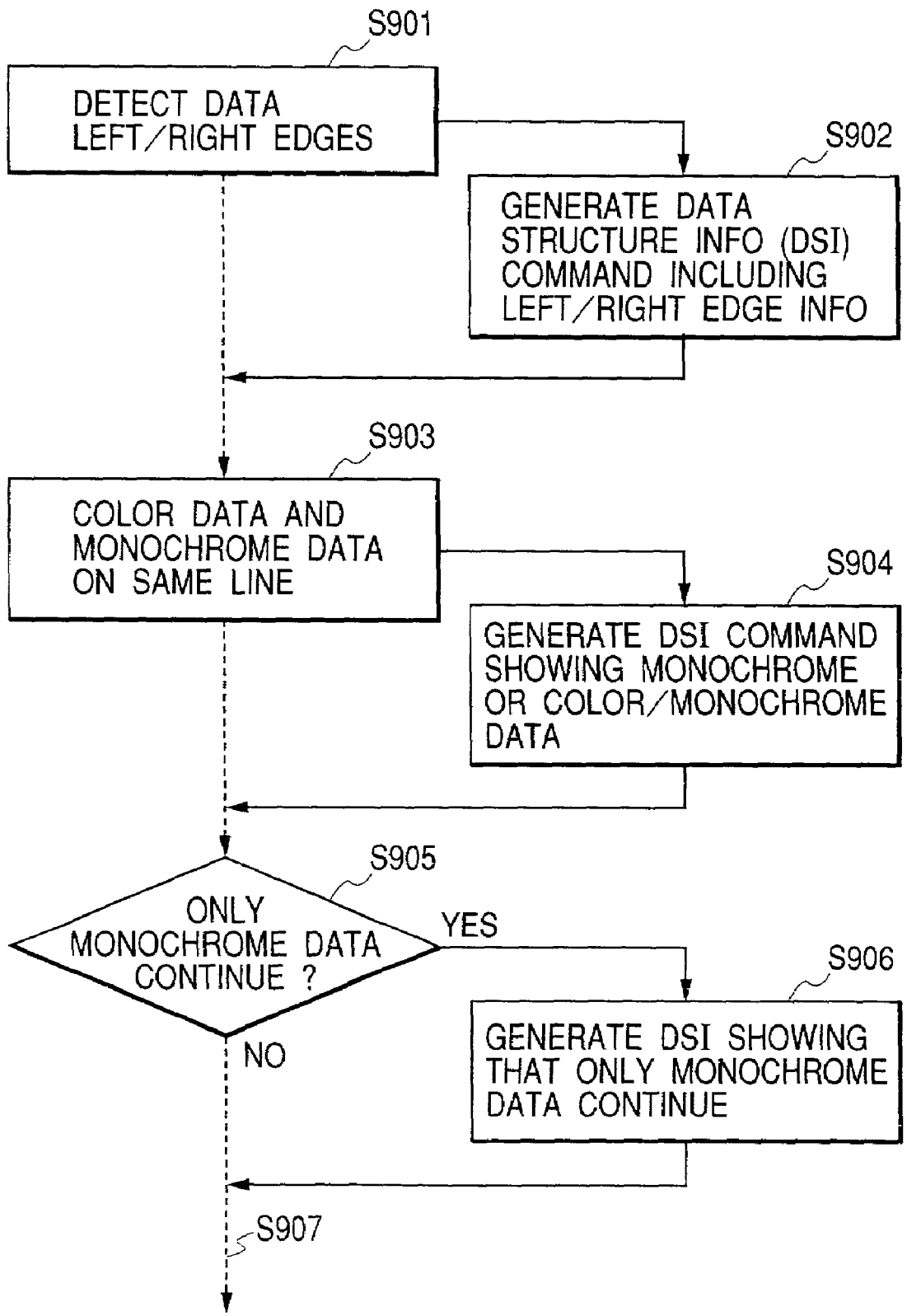
FIG. 9 is a flowchart showing a procedure for adding the structure information on the host (printer driver) side.

FIG. 9 is a flowchart showing a procedure for adding the structure information on the host (printer driver) side. The printer driver detects information of the right and left edges of the data when a compressing process of the data is executed or when a buffer size for reserving the data is found (S901) and adds the detected information as a command in order to notify the printer side of it (S902). Further, the printer driver checks whether the color data and the monochrome data exist on the same line or not (S903) and also adds a check result as structure information (S904). Whether only the monochrome data continues or not is checked when the data is reserved in the buffer (S905). If it can be confirmed, information showing to what number line of the next data the data of only black continues is added (S906) and the printer is notified of it. It is not always necessary that the above information has to be always added as structure information. If it is determined that the driver cannot form the structure information due to a shortage of the buffer amount, a problem of a data processing time, or other factors, the processes can be also executed along a route shown by a dotted line (S907) shown in the flowchart without forming the structure information. In this case, the printer side analyzes the data and prints in a manner similar to the conventional one.

(Second Embodiment)

Figure 10B:
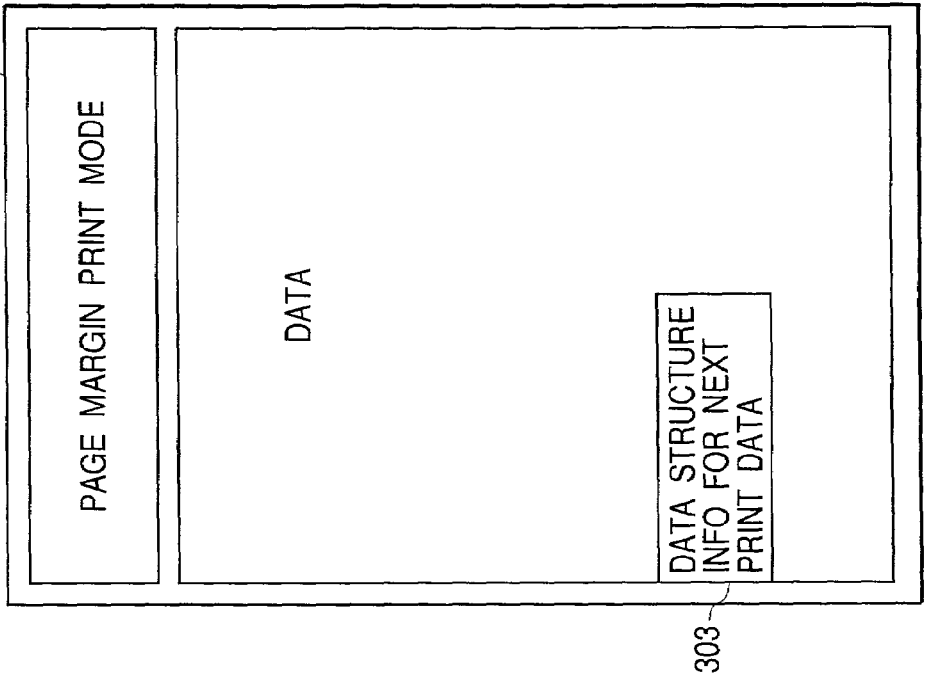
FIGS. 10A and 10B are diagrams each showing a construction of a print job which is sent to the printer 40 by the printer driver according to the second embodiment.
Figure 10A:

FIGS. 10A and 10B are diagrams each showing a construction of a print job which is sent to the printer 40 by the printer driver in the second embodiment. Since a construction of a print system is similar to that of the first embodiment, its description is omitted here.

As mentioned above, hitherto, as shown in FIG. 10A, even if there is information which can be checked during the generation of the data, the printer driver does not particularly notify the printer of such information but sends only the print data. Therefore, since there is not next information showing by which construction the print data is sent, in order to check the data structure, the printer 40 accumulates a predetermined amount of the received print data, selects the optimum printing method while analyzing the structure of the print data, and starts to print. According to such processes, since the buffers of a predetermined amount are needed and the data processes before printing are necessary, they become a load on the printer side.

On the other hand, as shown in FIG. 10B, according to a print job 302 of the embodiment, prior to the print data, structure information 303 of the next print data is sent. Sending timing of the structure information 303 can be set to arbitrary timing. According to the second embodiment, when the structure information 303 of the next print data is received, particularly, if the structure information of the next print data is concerned with the next page, for example, in the case where information showing that the data exists also in the next page and the print mode is the same as the current mode is obtained, the printer 40 subsequently executes the present process and can analyze the data without resetting it.

When the paper is ejected, since it has been confirmed that the data exists in the next page, the paper feeding operation is performed subsequently to the paper ejecting operation, thereby making it possible to prepare for printing the next page.

Further, even when the print mode of the next page differs from that of the current page, with respect to a portion such that the next page can be coped with, by switching to the correspondence to the next page during the present printing operation, processing efficiency can be raised. On the other hand, if the occurrence of an error such as an absence of the ink or the like during the print of the next page can be predicted by obtaining the information of the next page, it is also possible to cause the error before the relevant page is printed.

Further, even in case of the data existing over the pages, if the data exists in the next page and, further, if it is possible to determine that the next print mode is a mode in which the print can be continuously executed after the present print, the print can be efficiently performed without causing a vain waiting time.

Although the embodiments of the invention has been described above, the invention is not limited to the constructions of the embodiments but can be also applied to any construction so long as it can accomplish the functions shown by the scope of claims of the invention or the functions which the constructions of the embodiments have.

For example, in the embodiments, although the structure information has been sent block by block or page by page prior to sending the print data, it can be also sent simultaneously with the transmission of the print data. Also in this case, the printer does not need to analyze the structure of the print data but can efficiently print it.

Naturally, the invention can be also applied to a case where program codes of software to realize the functions of the embodiments mentioned above are stored into a memory medium and the program codes are read out from the memory medium and supplied to a system or an apparatus, thereby realizing the functions of the embodiments. In this case, the program codes themselves read out from the memory medium realize the novel functions of the invention. The program codes themselves and the memory medium in which the program codes have been stored construct the invention.

In the embodiments, the program codes shown in the flowcharts of FIGS. 3A and 3B have been stored in each of the memory media of the host computer 20 and printer 40. The memory medium to supply the program codes is not limited to the ROM but, for example, a floppy disk, a hard disk, an optical disk, a magnetooptic disk, a CD-ROM, a CD-R, a DVD, a magnetic tape, a non-volatile memory card, or the like can be used.

As many apparently widely different embodiments of the present invention can be made without departing from the spirit and scope thereof, it is to be understood that the invention is not limited to the specific embodiments thereof except as defined in the appended claims.

According to the invention, if the printer driver can previously check the data structure information during the data generation, the printing efficiency can be raised by using it. That is, when the data structure information exists, the print is performed by using it, and if there is no data structure information, the print is performed while analyzing the data, thereby enabling the print to be efficiently executed.

Even in case of the print data existing over the pages, if the print data exists in the next page and, further, if it is determined that the next print mode is a mode in which the process can be continuously executed after the present print, the print can be efficiently performed without causing a vain waiting time.

What is claimed is:

1. A print system in which a printing apparatus prints by using print data which is sent by a printer driver which is made operative by an information processing apparatus, wherein said printer driver comprises:
    a structure information generation unit adapted to divide each page of print data to be sent into a plurality of data blocks and to generate structure information of each data block, the structure information including a color attribute of the data block;
    an information adding unit adapted to add the structure information generated by said structure information generation unit to each data block of the print data which is sent; and
    an information sending unit adapted to send the print data including the added structure information to said printing apparatus,
    wherein said printing apparatus comprises:
    a determination unit adapted to determine a number of nozzles of a print head to be used for each data block of the print data on the basis of the received structure information; and
    a print process unit adapted to execute a printing process of the data block of the print data by using the number of nozzles determined by said determination unit,
    wherein if data of a next page exists, during the print of a present page, said printer driver notifies said printing apparatus of a print mode and a data structure of the next page as said structure information by said information sending unit, and
    wherein if it is possible to confirm that a printing operation which is being performed at present can be continuously executed from said notified contents, said printing apparatus subsequently executes a process of the next page.

2. A system according to claim 1, wherein said printer driver analyzes said print data before said print data is sent to said printing apparatus, and said analyzed information is set as said structure information.

3. A system according to claim 1, wherein when said structure information is not sent, said printing apparatus analyzes said print data and prints.

4. A system according to claim 1, wherein said structure information includes at least either information showing whether the print data which is subsequently printed is color data or monochrome data or information showing whether said color data and said monochrome data are adjacent to each other or not, and said printing apparatus prints on the basis of said structure information.

5. A system according to claim 1, wherein said structure information includes at least one of information showing on what number line from a present position the print data which is subsequently printed is generated, information showing from what number line color data starts, and information showing from what number line monochrome data starts, and said printing apparatus prints on the basis of said structure information.

6. A system according to claim 1, wherein said structure information is information regarding right and left edges of the print data which is subsequently printed, and said printing apparatus prints on the basis of said structure information.

7. A system according to claim 1, wherein said printer driver can set a designated area of said structure information which is added to said print data on an arbitrary unit basis.

8. A system according to claim 1, wherein said information sending means sends said structure information to said printing apparatus prior to sending said print data, thereby allowing said printing apparatus to recognize a structure of the print data which is subsequently sent.

9. A system according to claim 8, wherein if the data of the next page exists during the print of the present page, said printer driver notifies said printing apparatus of such a fact by said information sending means.

10. A system according to claim 9, wherein if it is possible to confirm that it is difficult to continue the print and an error will occur from said notified contents, said printing apparatus causes an error prior to printing said page.

11. A printing method by which a printing apparatus prints by using print data which is sent by a printer driver which is made operative by an information processing apparatus, comprising the steps of:
    dividing each page of print data to be sent into a plurality of data blocks and generating structure information of each data block, the structure information including a color attribute of the data block;
    adding the generated structure information to each data block of the print data which is sent by said printer driver;
    sending the print data including the added structure information to said printing apparatus;
    determining a number of nozzles of a print head to be used for each data block of the print data on the basis of the structure information received by the printing apparatus; and
    executing a printing process of the data block of the print data by using the determined number of nozzles,
    wherein if data of a next page exists, during the print of a present page, said printer driver notifies said printing apparatus of a print mode and a data structure of the next page as said structure information in said sending step, and
    wherein if it is possible to confirm that a printing operation which is being performed at present can be continuously executed from said notified contents, the printer apparatus executes a process of the next page.

12. A method according to claim 11, wherein said printer driver analyzes said print data before said print data is sent to said printing apparatus, and said analyzed information is set as said structure information.

13. A method according to claim 11, wherein when said structure information is not sent, said printing apparatus analyzes said print data and prints.

14. A method according to claim 11, wherein said structure information includes at least either information showing whether the print data which is subsequently printed is color data or monochrome data or information showing whether said color data and said monochrome data are adjacent to each other or not, and said printing apparatus prints on the basis of said structure information.

15. A method according to claim 11, wherein said structure information includes at least one of information showing on what number line from a present position the print data which is subsequently printed is generated, information showing from what number line color data starts, and information showing from what number line monochrome data starts, and said printing apparatus prints on the basis of said structure information.

16. A method according to claim 11, wherein said structure information is information regarding right and left edges of the print data which is subsequently printed, and said printing apparatus prints on the basis of said structure information.

17. A method according to claim 11, wherein said printer driver can set a designated area of said structure information which is added to said print data on an arbitrary unit basis.

18. A method according to claim 11, wherein in said step of sending said structure information, said structure information is sent to said printing apparatus prior to sending said print data, thereby allowing said printing apparatus to recognize a structure of the print data which is subsequently sent.

19. A method according to claim 18, wherein if data of a next page exists during the print of a present page, said printer driver notifies said printing apparatus of such a fact in said information sending step.

20. A method according to claim 19, wherein if it is possible to confirm that it is difficult to continue the print and an error will occur from said notified contents, said printing apparatus causes an error prior to printing said page.

21. A printing apparatus for printing by using print data which is sent by a printer driver which is made operative by an information processing apparatus, comprising:
an information receiving unit adapted to receive structure information added to each data block of the print data which is sent by said printer driver, the structure information including a color attribute of the data block divided from the print data;
a determination unit adapted to determine a number of nozzles of a print head to be used for each data block of the print data on the basis of the received structure information; and
a print processing unit adapted to perform a printing process of the data block of the print data by using the number of nozzles determined by said determination unit,
wherein if it is possible to confirm that a printing operation which is being performed at present can be continuously executed from said structure information of a next page, said print processing unit subsequently executes a process of the next page.

22. A printing method for a printing apparatus using print data which is sent by a printer driver which is made operative by an information processing apparatus, comprising the steps of:
receiving structure information added to each data block of the print data which is sent by said printer driver, the structure information including a color attribute of the data block divided from the print data;
determining a number of nozzles of a print head to be used for each data block of the print data on the basis of the received structure information; and performing a printing process of the data block of the print data by using the determined number of nozzles,
wherein if it is possible to confirm that a printing operation which is being performed at present can be continuously executed from said structure information of a next page, a process of the next page is subsequently executed.

23. A print system in which a printing apparatus prints by using print data which is sent by a printer driver which is made operative by an information processing apparatus,
wherein said printer driver divides each page of print data to be sent into a plurality of data blocks to generate structure information of each data block, the structure information including a color attribute of the data block, adds the generated structure information to each data block of the print data which is sent, and sends the print data including the added structure information to said printing apparatus,
wherein said printing apparatus determines a number of nozzles of a print head to be used for each data block of the print data on the basis of the received structure information, executes a printing process of the data block of the print data by using the determined number of nozzles,
wherein if a data of next page exists, during the print of a present page, said printer driver notifies said printing apparatus of a print mode and a data structure of the next page as said structure information, and
wherein if it is possible to confirm that a printing operation which is being performed at present can be continuously executed from said notified contents, said printing apparatus subsequently executes a process of the next page.

24. A printing apparatus for printing by using print data which is sent by a printer driver which is made operative by an information processing apparatus,
wherein said printing apparatus receives structure information added to each data block of the print data which is sent by said printer driver, the structure information including a color attribute of the data block divided from the print data, determines a number of nozzles of a print head to be used for each data block of the print data on the basis of the received structure information, and performs a printing process of the data block of the print data by using the determined number of nozzles, and
wherein if it is possible to confirm that a printing operation which is being performed at present can be continuously executed from said structure information of a next page, said printing apparatus subsequently executes a process of the next page.

* * * * *

UNITED STATES PATENT AND TRADEMARK OFFICE
CERTIFICATE OF CORRECTION

| | | |
|---|---|---|
| PATENT NO. | : 7,145,668 B2 | |
| APPLICATION NO. | : 10/020229 | |
| DATED | : December 5, 2006 | |
| INVENTOR(S) | : Kazunari Shishido | |

It is certified that error appears in the above-identified patent and that said Letters Patent is hereby corrected as shown below:

<u>COLUMN 8</u>
Line 22, "has" should read --have--.

<u>COLUMN 12</u>
Line 22, "executes" should read --and executes--.

Signed and Sealed this

First Day of May, 2007

JON W. DUDAS
*Director of the United States Patent and Trademark Office*